No. 744,101.  
Patented November 17, 1903.

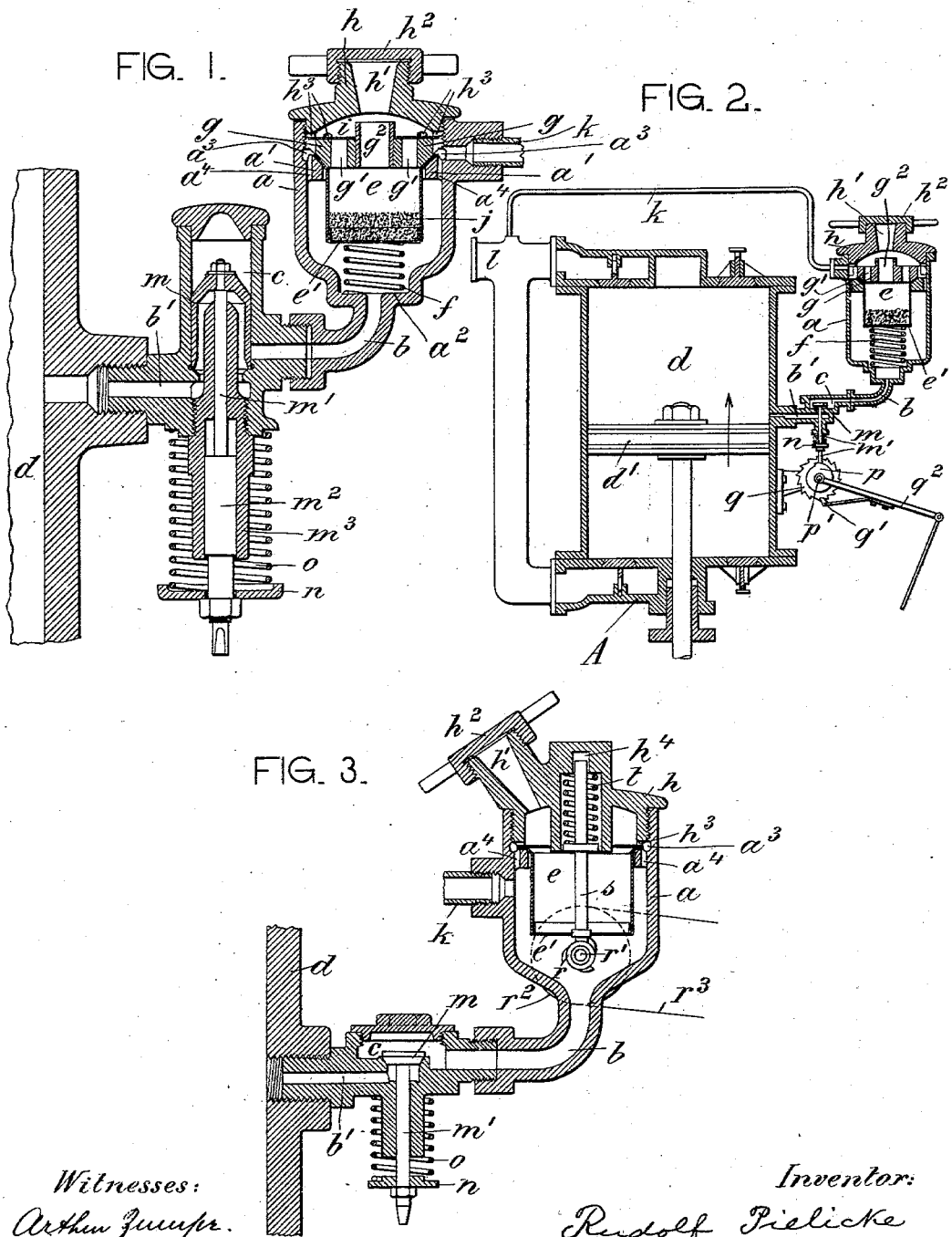

UNITED STATES PATENT OFFICE.

RUDOLF PIELICKE, OF NEW YORK, N. Y.

GRAPHITE LUBRICATOR.

SPECIFICATION forming part of Letters Patent No. 744,101, dated November 17, 1903.

Application filed June 17, 1903. Serial No. 161,767. (No model.)

*To all whom it may concern:*

Be it known that I, RUDOLF PIELICKE, a citizen of Germany, residing at New York city, (Bronx,) county and State of New York, have invented certain new and useful Improvements in Graphite Lubricators, of which the following is a specification.

This invention relates to an improved lubricator by which graphite-powder is applied as a lubricant in the form of a fine dust, so that any clogging of the apparatus is prevented.

In the accompanying drawings, Figure 1 is a vertical longitudinal section of my improved lubricator. Fig. 2 is a similar section of an air-compressor to which the lubricator is applied, and Fig. 3 a vertical section through a modification of the lubricator.

The letter $a$ represents a cup communicating by conduit $b$, valve-chamber $c$, and conduit $b'$ with the cylinder $d$ of an air-compressor A or with a steam-engine or other element to which the lubricant is to be supplied. The cup $a$ is provided with an annular flange $a'$, which constitutes the seat for the upper flanged end of a leather or other flexible bag $e$, having a foraminated rigid bottom $e'$ and adapted for the reception of graphite-powder. The bag $e$ is influenced by a spring $f$, interposed between bottom $e'$ and an offset $a^2$ of cup $a$. Upon the flanged top of bag $e$ is fitted a lid $g$, having air-ducts $g'$ and inlet $g^2$ for the graphite. A cover $h$, screwed into the upper threaded end of cup $a$, bears upon lid $g$, and thus locks such lid, as well as the upper end of the bag, in position. The cover $h$ has an opening $h'$ for introducing the graphite, which opening may be closed by a cap $h^2$.

Above the flange $a'$ the cup $a$ is provided with an annular channel $a^3$, that communicates by ducts $h^3$ of cover $h$, air-space $i$, and ducts $g'$ with the interior of the bag $e$ above the surface of the graphite $j$. The channel $a^3$ likewise communicates by ducts $a^4$ of flange $a'$ with the space intermediate the interior of cup $a$ and the exterior of bag $e$, and consequently with the conduit $b$. The channel $a^3$ receives air or other gas under pressure from a pipe $k$, the compressed air being obtained from any suitable source. The drawing Fig. 2 shows the compressed air being obtained from the service-pipe $l$ of air-compressor A.

In order to automatically supply the lubricant at predetermined intervals, I fit into the valve-casing $c$ a valve $m$, which automatically connects the conduits $b\ b'$ whenever the lubricant is to be applied and disconnects such conduits whenever the lubricant is to be excluded. As shown in the drawings, the valve $m$ is fitted upon a stem $m'$, provided with an enlargement $m^2$, which is slidable in a tubular guide $m^3$, tapped into valve-chamber $c$. To the stem $m'\ m^2$ is secured a disk $n$, influenced by a spring $o$, which tends to normally draw the valve $m$ down, and to thus close the conduit $b$, Fig. 1. The valve may be raised intermittently in various manners, the drawing Fig. 2 showing the stem $m'\ m^2$ in engagement with an eccentric $p$, mounted on a shaft $p'$, which also carries a ratchet-wheel $q$. This wheel is engaged by a pawl $q'$, fast on a lever $q^2$, which is rocked by a suitable link connection. Thus the eccentric upon each complete rotation will alternately open and close the valve $m$, as will be readily understood.

The operation is as follows: The air under pressure from pipe $k$ will flow into channel $a^3$ and will thence pass partly through ducts $h^3$, air-space $i$, and ducts $g'$ into the interior of bag $e$ to exercise a pressure upon the surface of the graphite $j$. The other part of the air will flow through ducts $a^4$ into the space between cup $a$ and bag $e$ and into conduit $b$. After valve $m$ has been opened an air-current will flow through conduits $b\ b'$ into the cylinder $d$ to be lubricated. This air-current carries along small particles of graphite falling through the foraminated bottom $e'$ of bag $e$. During this lubricating process the alternating high and low pressure at both sides of the reciprocating piston $d'$ will effect small vibrations of bag $e$ in order to discharge small particles of graphite through bottom $e'$ of bag $e$ in the following manner:

The upwardly-moving piston $d'$ is shown in Fig. 2 in a position just before closing duct $b'$, which is in communication with the high-pressure side of cylinder $d$. After piston $d'$ has cleared duct $b'$ during this upward motion, so that duct $b'$ is in communication with the low-pressure side of piston $d'$, an air-jet carrying graphite particles will flow from cup $a$ through ducts $b$ $b'$ into said low-pressure side of cylinder $d$. This air-jet will slightly decrease the pressure around bag $e$, so that the higher pressure within the bag will expand the latter and compress spring $f$. After piston $d'$ has arrived at its reversing-point the formerly low-pressure side of piston $d'$, with which duct $b'$ is still in communication, will change into the high-pressure side. Consequently the pressure in the space around bag $e$ will increase, so that spring $f$ distends and the bag will slightly collapse. This operation will take place at each stroke of the piston and results in slight vibrations of the bottom of bag $e$. In this way small particles of graphite are discharged out of the bag at each stroke of the piston.

In Fig. 3 the vibrations of bag $e$ are effected by means of a cam $r$, fast on shaft $r'$, that receives rotary motion through pulley $r^2$ and belt $r^3$. The cam $r$ engages a spindle $s$, to which the bottom $e'$ of bag $e$ is attached. At its upper end spindle $s$ is slidable within a tubular guide $h^4$ of cover $h$. A spring $t$ presses spindle $s$ and also bottom $e'$ downwardly. It will be seen that the rotation of cam $r$ will impart a reciprocating motion to the bottom $e'$ of bag $e$ in order to discharge the graphite out of the bag.

What I claim is—

1. A lubricator provided with a perforated flexible spring-influenced bag, and means for automatically agitating said bag, substantially as specified.

2. A lubricator provided with a perforated bag, and means for conveying gas under pressure to the bag and from the bag to the point to be lubricated, substantially as specified.

3. A lubricator provided with a perforated bag, means for conveying gas under pressure into said bag, and means for conveying gas under pressure around the bag to the point to be lubricated, substantially as specified.

4. A lubricator provided with a perforated flexible spring-influenced bag, means for conveying gas under pressure into the bag, and means for conveying gas under pressure around the bag to the point to be lubricated, substantially as specified.

5. The combination of a cup having a perforated seat therein, with a spring-influenced perforated bag within the cup and supported upon said seat, and means for conveying gas under pressure to the cup, substantially as specified.

6. The combination of a cup having a perforated seat therein, with a spring-influenced perforated bag within the cup and supported upon said seat, a perforated lid upon the bag, and means for conveying gas under pressure to the cup, substantially as specified.

7. The combination of a cup with a spring-influenced perforated bag within the cup, means for conveying gas under pressure to the cup, and a conduit for connecting the cup to the part to be lubricated, substantially as specified.

8. The combination of a cup with a spring-influenced perforated bag within the cup, means for conveying gas under pressure to the cup, a conduit for connecting the cup to the part to be lubricated, a valve for closing the conduit, and means for automatically operating the valve, substantially as specified.

9. The combination of a cup having a perforated seat therein, with a spring-influenced perforated bag within the cup and supported upon said seat, a perforated lid upon the bag, means for conveying gas under pressure to the cup, a conduit for connecting the cup to the part to be lubricated, a valve for closing the conduit, and means for automatically operating the valve, substantially as specified.

Signed by me at New York city, (Manhattan,) New York, this 15th day of June, 1903.

RUDOLF PIELICKE.

Witnesses:
ARTHUR A. ZIEGE,
FRITZ GERB.